United States Patent
Ganser et al.

(10) Patent No.: US 6,545,765 B1
(45) Date of Patent: Apr. 8, 2003

(54) METHOD AND APPARATUS FOR MEASURING THICKNESS OF TRANSPARENT FILMS

(75) Inventors: Michael Ganser, Giessen (DE); Albrecht Weiss, Linden (DE)

(73) Assignee: Leica Microsystems Heidelberg GmbH (DE)

( * ) Notice: Subject to any disclaimer, the term of this patent is extended or adjusted under 35 U.S.C. 154(b) by 134 days.

(21) Appl. No.: 09/708,778

(22) Filed: Nov. 8, 2000

Related U.S. Application Data

(60) Provisional application No. 60/164,162, filed on Nov. 8, 1999.

(51) Int. Cl.$^7$ ............................................... G01B 11/06
(52) U.S. Cl. ..................... 356/632; 356/382; 356/355; 356/445; 156/626.1; 156/612; 250/560
(58) Field of Search .................. 356/632, 382, 356/381, 357, 355, 345, 445; 156/626.1, 601, 612, 626, 627; 250/560

(56) References Cited

U.S. PATENT DOCUMENTS 5,450,205 A * 9/1995 Sawin et al. ................. 216/60
5,493,401 A * 2/1996 Horie et al. ............ 250/559.26
5,898,500 A * 4/1999 Canteloup et al. .......... 356/492

* cited by examiner

Primary Examiner—John R. Lee
Assistant Examiner—Zia R. Hashmi
(74) Attorney, Agent, or Firm—Brown Rudnick Berlack Israels, LLP

(57) ABSTRACT

A method and an apparatus for measuring thickness of transparent films is described in which an illumination beam is directed through an objective onto an object comprising a transparent film. A structured focusing aid is disposed in the illumination beam, a camera is disposed in an imaging beam. The focusing aid and the camera each are disposed in locations conjugated with the focal plane of the objective. The focal plane of the objective is displaced stepwise through the object. At each position, a camera image is recorded and its focus score is determined, the image of the focusing aid being used as the contrast indicator. The positions with maximal focus scores are assigned to the locations of the interfaces. The thickness of the transparent film is calculated from the difference between the positions of its interfaces.

13 Claims, 4 Drawing Sheets

METHOD AND APPARATUS FOR MEASURING THICKNESS OF TRANSPARENT FILMS

CROSS CLAIM TO A RELATED APPLICATION

This application claims priority from an earlier filed U.S. provisional patent application Serial No. 60/164,162 filed on Nov. 8, 1999, which application is incorporated herein by reference.

BACKGROUND OF THE INVENTION

The invention relates generally to a method and apparatus for measuring thickness of transparent films and is used for measuring thickness of transparent, partially reflective films. For example, the invention can be used in blood analysis based, inter alia, on the quantitative evaluation of the intensities of a fluorescence radiation of a blood film. To perform the quantitative evaluation accurately, it is important to know the thickness of the blood film.

For example, in blood analysis, the blood is present in a special single-use microcuvette made of glass or plastic or a glass/plastic combination. Production-related tolerances in the dimensions of a single-use microcuvette make it necessary to measure the thickness of the blood film at different points of the already filled single-use microcuvette.

It would be possible to monitor the thickness tolerances of a single-use microcuvette, for example, with a mechanical feeler. The thickness of the blood film is determined, however, by the internal dimensions of a single-use microcuvette, which may have tolerance deviations different from those of the outside dimensions. But because the feeler can sense only the outside dimensions, it is unsuitable for determining the thickness of the blood film.

Another method for monitoring thickness tolerances of a single-use microcuvette involves interferometric measurements of the blood film. This is done, for example, by using an interferometer arrangement in a reflected-light microscope where the illumination light is propagating out of a spectrometer.

A filled single-use microcuvette is placed on the object stage of the microscope to be illuminated by the interferometer beam. The microscope illumination beam is reflected and interfered with all the interfaces of the single-use microcuvette. The measurement is performed for various wavelengths of the illumination light provided by the spectrometer. If the refractive index is known, the thickness of the individual films can be determined from the interference values as a function of the wavelength. In analyzing the measurements, however, it proves to be very difficult to separate the light components reflected from the various interfaces. A further disadvantage is the need to have a spectrometer, which is costly and requires a great deal of space.

It is therefore the object of the present invention to describe a method and apparatus for measuring thickness of transparent films. In paticular, the method and apparatus are intended to be suitable for transparent liquid films on a substrate or in a closed container, such as, for example, a microcuvette.

According to the present invention, a focusing aid is disposed along the path of an illumination beam of an objective in a position conjugated with the focal plane. The image formed in the focal plane is captured by an image-capturing device, such as, for example, a camera. The focusing aid is imaged sharply on the camera only when a partially reflective interface of an object is in the focal plane. The contrast of the image of the focusing aid, monitored with the camera, thus serves as a "focus indicator". The invention makes use of this fact to determine thickness of various films.

The illumination beam is directed through the objective onto an object comprising a transparent film. The object used is, for example, a single-use microcuvette for blood analysis that contains a transparent blood film. Alternatively, it is also possible to use an object support that carries a transparent blood film.

By changing a position of the object in the Z direction relative to the objective, the position of the focal plane of the objective relative to the object changes. The values of the stop positions Zi are measured. At each stop position, a camera image is recorded and its focal score is determined, the image of the structure of the focusing aid being used as contrast indicator.

For the best image evaluation, it is advantageous if the structure on the focusing aid has a dimension of at least one bar, with the bar length being a multiple of the bar width and the bar width being a multiple of the resolution capability of the objective and the camera. Multiple bars can also be used. It is advantageous to use a cross-shaped figure having the dimensions discussed above. The cross can be adapted to different pixel widths and heights.

A blurred image yields a low focus score; a sharp image yields a high focus score. In other words, when the image of the structure of the focusing aid appears sharp in the camera image, it means that the interface of the single-use microcuvette is in the focal plane, and the focus score has a maximum.

The maxima of the focus scores are therefore determined for stop positions $z_i$. The positions $z_i$ with maximal focus scores are assigned to the locations of the various interfaces such as, for example, the air-glass, the glass-liquid, the liquid-glass, and the glass-air interfaces in the case of a microcuvette filled with a liquid.

Various interfaces differ greatly in terms of reflectivity. Glass-air interfaces, for example, reflect light stronger than glass-liquid interfaces by a factor of about 10. Because the reflection intensities are incorporated into the calculation of the focus scores, it is possible to identify the type of an interface based on the magnitudes of the identified focus scores.

The thickness of a transparent film, e.g. of the liquid in a microcuvette, is then calculated from the difference between the positions $z_1$, $z_2$ corresponding to the maximal focus scores. The thickness d is calculated as $d=(z_1-z_2) \cdot n_{film}$, where $n_{film}$ is the refractive index of the film. Multiplying by film takes into account the optical path length modified by the refractive index of the film.

In correlating the maxima of the focus scores with the interfaces of the object the film being measured, certain preliminary information concerning the nature and/or approximate location of the interfaces and the film is utilized. This information yields further possibilities for making the correlation. For example, the following information can be used:

The displacement path selected for the object is so long that the image corresponding to the first interface is always captured, and the first maximum of the focus scores can thus be correlated with the first interface.

This is particularly advantageous for an object with a sandwich structure (i.e. having multiple material layers), for example, a microcuvette.

The interfaces of particular interest, for example, the inner walls of a microcuvette, are predefined with sufficient accuracy in terms of their expected location. These may be manufacturer's tolerance data concerning the dimensions of the microcuvette. If, on the basis of these data, the outer interfaces are at a sufficient distance from the inner interfaces of the microcuvette, a direct correlation between the maxima of the focus scores and the inner interfaces is possible. The displacement path of the object and the number of camera images necessary for the calculation can then also be reduced. This approach offers the advantage in that the measurement times can be considerably reduced. The method is therefore particularly suitable for routine laboratory investigations.

The method of the present invention can reliably be used for measuring thickness of transparent films of all kinds. The transparent films can be:

self-supporting solid films in air or liquid;

solid or liquid films on a substrate (e.g. clinical smears on a glass slide); or solid or liquid films on a substrate having an additional transparent covering layer (sandwich structure).

The films, the substrate, and any covering layers are preferably smooth surfaces. The interfaces of the films are preferably only partially reflective; i.e. they can have very small differences in refractive index. Even the low levels of reflection resulting from these interfaces are sufficient for automatic image evaluation using the image analysis as described by the method according to the present invention.

BRIEF DESCRIPTION OF THE DRAWING FIGURES

The method and apparatus according to the present invention are shown and descried below as exemplary embodiments and with reference to the schematic drawings in which.

DETAILED DESCRIPTION OF THE INVENTION

Figure 1:
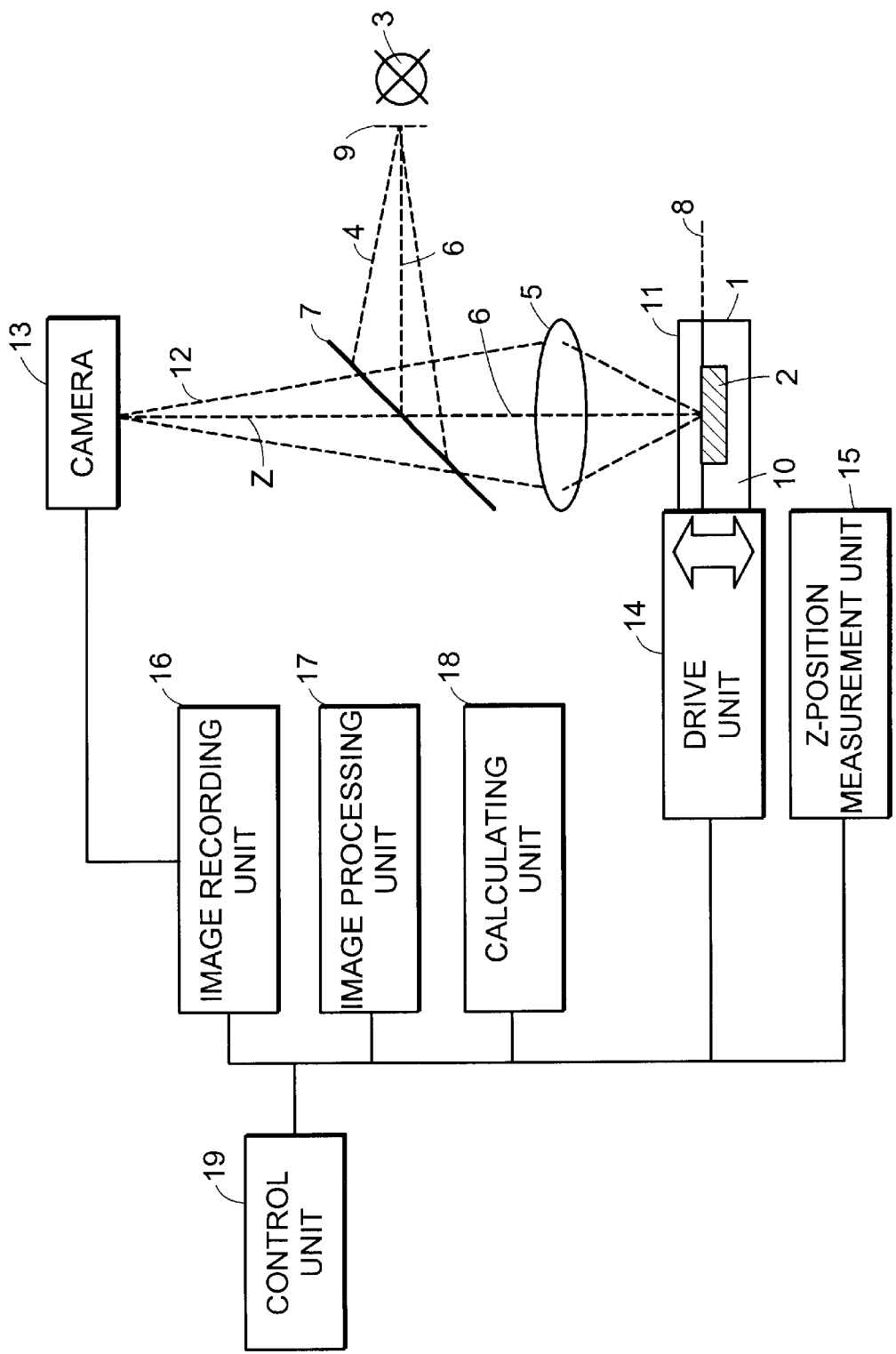
FIG. 1 shows a schematic illustration of an apparatus for film thickness measurement.

FIG. 1 shows an apparatus for carrying out the method of the present invention. An object 1 has a transparent film 2 having a thickness to be determined. An illumination beam 4 is generated by a light source 3 and is directed through an objective 5 onto object 1. In the embodiment of FIG. 1 optical axis 6 of illumination beam 4 is oriented perpendicular to film 2. Deflection of illumination beam 4 toward object 1 takes place in a beam splitter 7. In illumination beam 4, a focusing aid 9 containing one or more structures is disposed in a location conjugated with focal plane 8 of objective 5.

In FIG. 1, focal plane 8 lies at the upper interface of transparent film 2. This transparent film 2 is disposed in object 1. For that purpose, object 1 comprises a baseplate 10, which has a cavity in which transparent film 2 is located. Disposed on baseplate 10 is a transparent cover 11 that sealingly closes off the cavity with transparent film 2.

An imaging beam 12 propagates from the upper interface of transparent film 2, i.e. from focal plane 8. It passes through beam splitter 7 and is directed onto an image capturing device such as a camera 13 that is located in a position conjugated with focal plane 8.

The structure of focusing aid 9 is sharply imaged onto camera 13 by imaging beam 12 only if focal plane 8 lies in an interface of object 1 (as shown in FIG. 1). If focal plane 8 lies outside the interface of object 1, the structure of focusing aid 9 appears blurry in the camera image, which fact is utilized by the present invention.

Object 1 is coupled to a drive unit 14 displacing the objected relative to the objective. It is conceptually possible, of course, to displace the objective relative to the object. As object 1 is displaced, focal plane 8 can be moved through all the interfaces of object 1. A sharp image is produced on camera 13 only when the focal plane coincides with an interface. From the difference between the Z positions associated with the specific interfaces, a desired film thickness can then be determined. For this purpose, drive unit 14 is coupled to a Z-position measurement unit 15, measuring the current position $z_i$ of object 1.

Camera 13 is coupled to an image recording unit 16, and the latter is in turn coupled to an image-processing unit 17 and a calculating unit 18. Drive unit 14, Z-position measurement unit 15, image recording unit 16, image-processing unit 17, and calculation unit 18 are coupled to a control unit 19 controlling the implementation of the process steps.

Implementation of the method according to the present invention will be described below with reference to FIG. 1.

Object 1 is illuminated with illumination beam 4 traveling through objective 5; object 1 is in an initial position in which, in this particular example, focal plane 8 lies above the uppermost surface of transparent covering 11. The image captured by camera 13 is recorded by image recording unit 16. Since focal plane 8 is not located in a partially reflective interface of object 1, the image of focusing aid 9 is blurry on camera 13. A focus score $f(z_i)$ for the recorded camera image is determined using image processing unit 17. $Z_i$ corresponds to the current position of object 1, which is determined using Z-position measurement unit 15.

The procedure of recording a camera image and determining an associated focus score $f(z_i)$ is then performed for various positions $z_i$ of object 1 relative to objective 5. This is done by displacing object 1 stepwise toward objective 5 so that it successively moves through discrete positions $z_i$. In each stop position $z_i$, a camera image is recorded using camera 13 and image recording unit 16. At the same time, in each stop position $z_i$ the corresponding measured value for the position of object 1 is identified. Object 1 is displaced stepwise relative to objective 5 until focal plane 8 has passed through the lower interface of transparent film 2.

For each camera image recorded in the individual stop positions $z_i$, image processing unit 17 is used to determine a focus score $f(z_i)$. The obtained focus scores $f(z_i)$ are evaluated using calculation unit 18 by determining various maxima of the focus scores $f(z_i)$. Once determined, the maxima are correlated with the appropriate interfaces of object 1 and the associated $z_i$ position of the object can then be assigned to each maximum.

The thickness of transparent film 2 is determined from the difference between the $z_i$ positions of the maxima corresponding to the interfaces $z_1$, $z_2$ of transparent film 2; the film thickness d is calculated as $d=(z_1-z_2) \times n_{film}$, where $n_{film}$ is the refractive index of the film.

Figure 2:
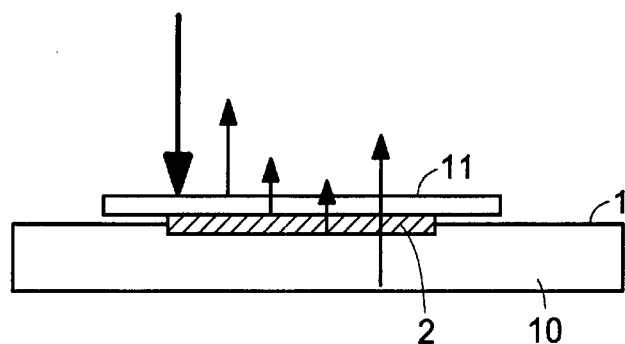
FIG. 2 shows a detailed view of a microcuvette with schematic light intensities at the interfaces.

FIG. 2 shows an enlarged view of object 1. The view can be, for example, a section through a liquid-filled microcuvette, depicting a baseplate 10 having a cavity that contains transparent film 2. In this example it is a liquid. Baseplate 10 is covered by a transparent covering 11 in such a way that its cavity is sealingly closed off.

FIG. 2 shows arrows having the size and line thickness schematically representing, by their direction and intensity, components of the reflected light (reflected at the individual interfaces of object 1). The components of the reflected light are schematically illustrated by the upward-pointing arrows. The illumination light is schematically illustrated by the thick arrow pointing downward. This schematic illustration graphically represents that the strongest reflections occur at the glass-air interfaces, i.e. at the top and bottom sides of object 1. The reflected light components are substantially smaller at the upper and lower interfaces of the transparent liquid film that is being measured. It is evident that various interfaces differ greatly in terms of their reflectivity: glass-air interfaces reflect stronger than glass-liquid interfaces by a factor of about 10. Since it is possible to determine the intensity of an image as it is being captured by the camera image while determining its focus score, it is possible to locate the positions of the interfaces from the values of the corresponding focus scores.

This is preferably done by taking into account the difference in intensity between each two adjacent pixels during the calculation of the focus scores. This difference is created for the pixels of the rows and columns of the camera image. One suitable function for calculating the focus scores is, for example, the following:

$$f(z_i) = \sum_n \sum_m (|I_n - I_m|^x), \text{ for } x > 1$$

where n is the number of pixels per line and m the number of pixels per column. $I_n$ and $I_m$, respectively, indicate the intensities of two adjacent pixels n, m. The exponent $x>1$ is applied to the intensity differences $|I_n-I_m|$, resulting in a non-linear function that gives higher significance to larger gradients.

The process of evaluation images captured by the camera is explained with reference to FIG. 3, which shows a measurement series of camera images recorded for various $z_i$ positions of object 1. A cross-shaped figures ("cross") was used as the structure of focusing aid 9.

Figure 3:
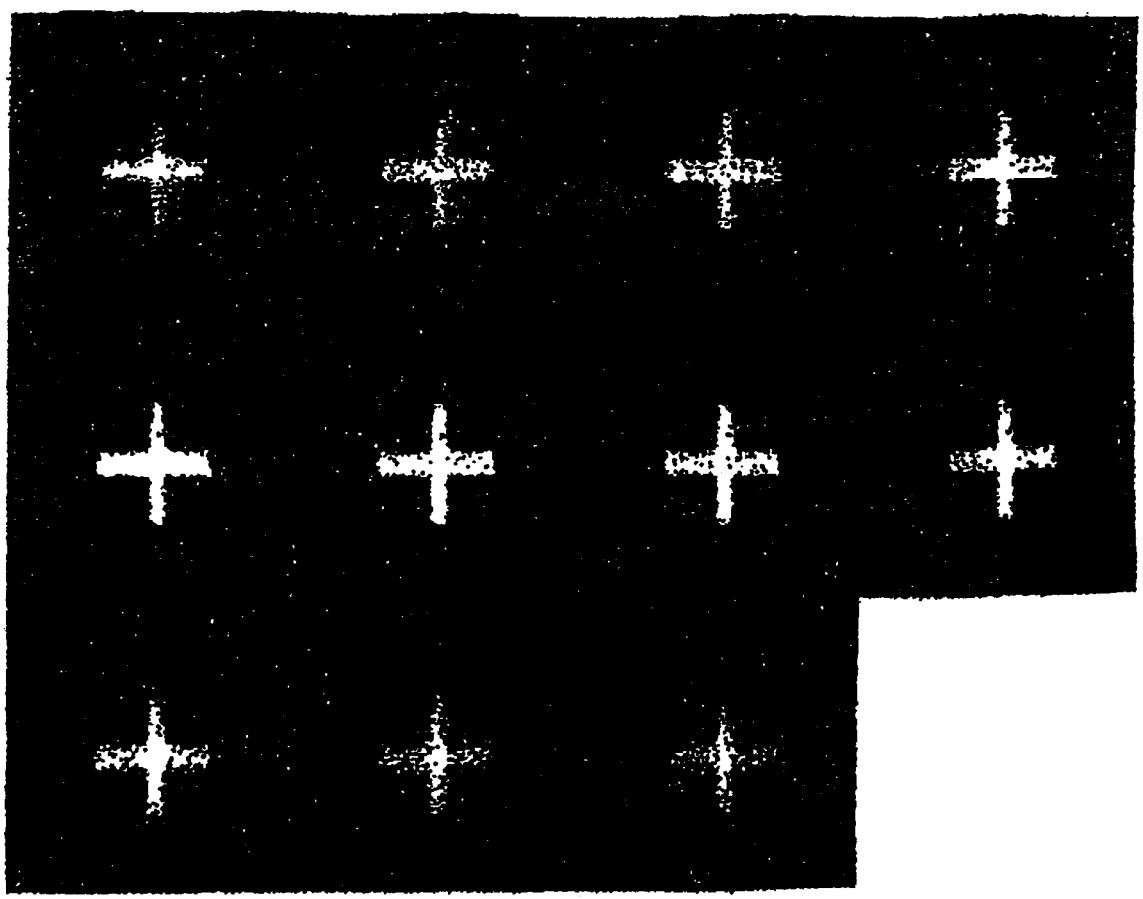
FIG. 3 shows a measurement series of camera images with image scores that vary as a function of a Z position.

In the individual camera images, shown in FIG. 3, the cross is imaged with different degrees of contrast and brightness, i.e. with different light intensity. Since focusing aid 9 is imaged sharply on the camera only if focal plane 8 is located in an interface of object 1, the intensity and contrast of the cross in the camera image serve as the focus criterion. The cross must therefore be considerably larger compared to the pixel size and heights of the camera.

In the first camera image (top left), the cross appears extremely blurry, meaning that focal plane 8 is located far away from an interface of object 1. With camera images 2, 3, and 4 (proceeding to the right), the contrast of the cross progressively improves. This means that at each respective position $z_i$ corresponding to these images focal plane 8 approached closer and closer an interface of object 1. The fifth camera image (left, second row) shows the greatest contrast of the cross of focusing aid 9; for all further camera images, the cross again becomes blurry. The conclusion from this is that camera image 5 was recorded in a $z_i$ position in which an interface of object 1 lies in focal plane 8.

In order to avoid such visual evaluation of an image contrast, a focus score $f(z_i)$ is determined for each camera image using the function described above. The highest focus score $f(z_i)$ is calculated for camera image 5, while correspondingly lower values for $f(z_i)$ are found for other camera images in accordance with their contrast and light intensity.

Figure 4:
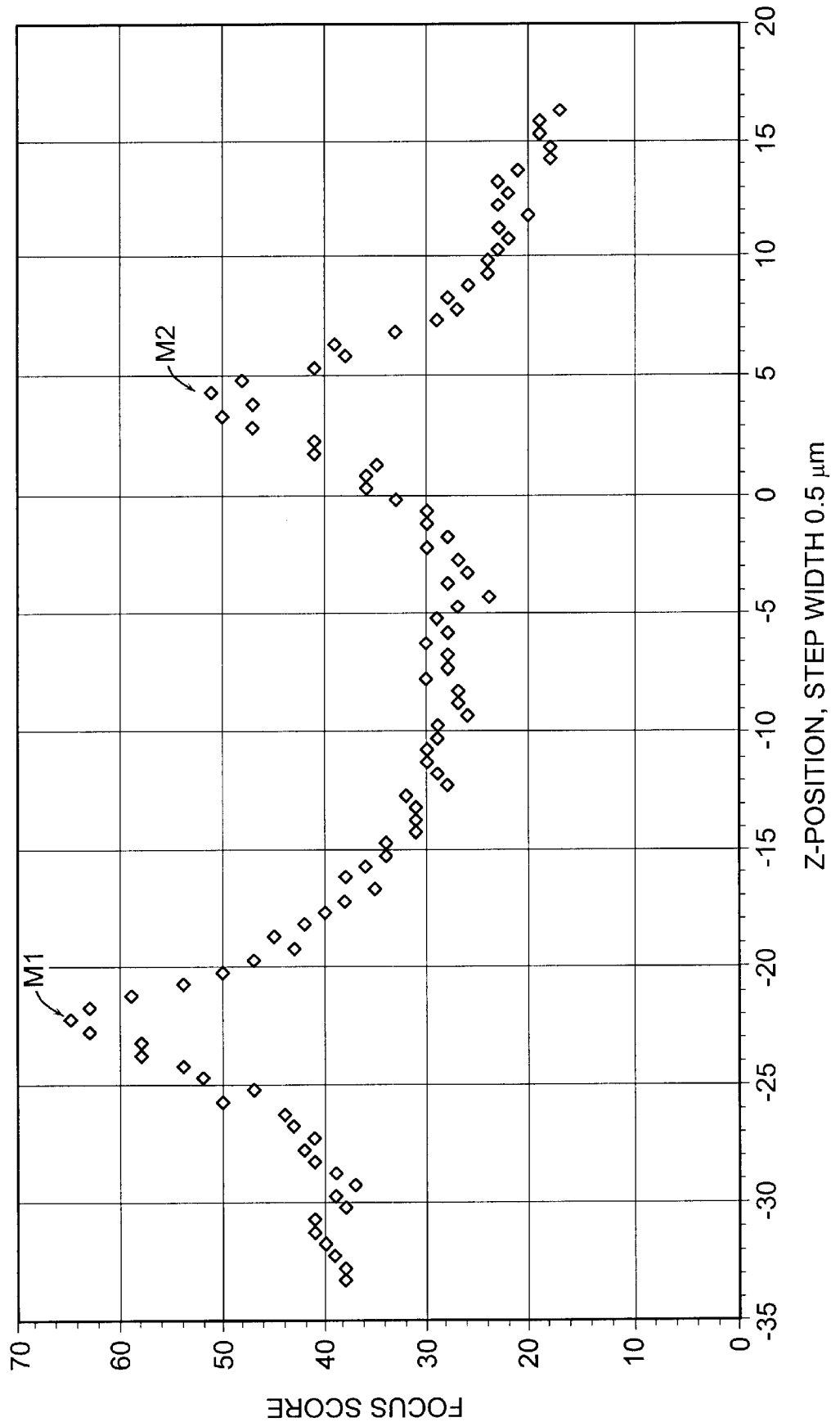
FIG. 4 shows a diagram of a measurement series of focus scores as a function of a Z position.

FIG. 4 shows a diagram of a measurement series of calculated focus scores as a function of stop positions $z_i$ of object 1. The shown focus scores are maximal at two ranges of positions $z_i$. At the left peak $M_1$ a focus score $F_1$ is obviously the maximum of peak $M_1$. At the right peak $M_2$, the measured focus scores cluster around the actual maximum; in other words the position of maximum image contrast was not captured. Determination of the actual maxima of the focus scores can therefore be greatly improved by using sufficiently small displacement intervals of object 1 during its displacement towards objective 5. The thickness of the film is then calculated from the difference between the positions corresponding to the two maxima. The maxima depicted in FIG. 4 lie approximately 30 µm apart. The two maxima shown in that figure were clearly indicative of the interfaces of transparent film 2 being measured, so that the thickness of transparent film 2 can be determined.

It has been assumed up to now that in order to improve the resolution during the determination of the maxima of the focus scores, the greatest possible number of measurements with short distance between the individual positions $z_i$ should be made. The disadvantages of such an approach, however, are the following: on the one hand a measurement takes a long time because of the large number of individual measurements, and, on the other hand, very large volumes of data must be processed.

In an advantageous embodiment, the method is therefore carried out using only a relatively few positions $z_i$. An analytical function is then created from the small number of the obtained focus scores $f(z_i)$.

Figure 5:
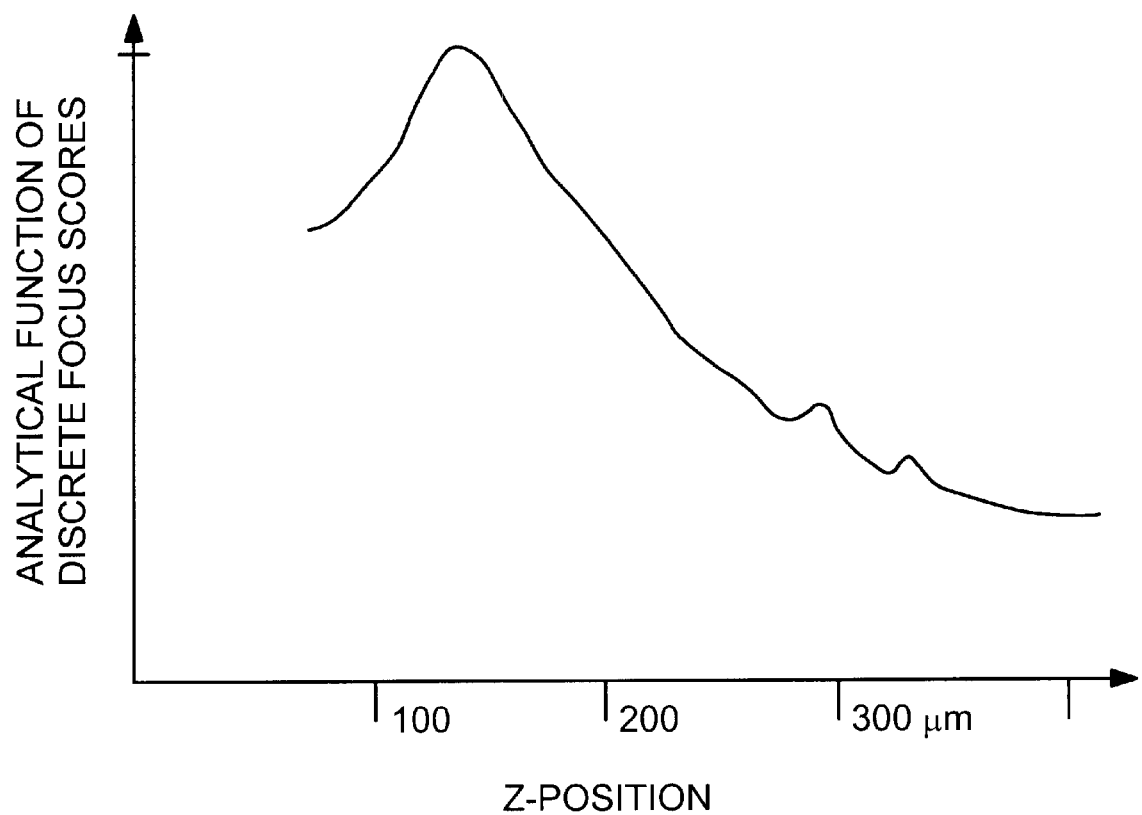
FIG. 5 shows a diagram of an analytical function for a measurement series of focus scores as a function of a Z position.

FIG. 5 shows one example of such an analytical function. The left portion of the curve shows a well-defined maximum of the focus score function, and the right portion of the curve has two small maxima a short distance apart from each other. As has already been explained with reference to FIG. 2, the strongest reflections and thus also the highest focus scores are generated by the air-glass interfaces of object 1. Therefore, the two small maxima of the focus score curve correspond to the glass-liquid interfaces of the upper and lower interfaces of transparent liquid film 2 in object 1. From the analytical function depicted here, it is therefore possible to determine the two smaller maxima with high accuracy, calculate their respective positions $z_i$ and, by taking the difference between the two respective positions $z_i$, determine the film thickness of transparent liquid layer 2 with high accuracy. Because of the smaller number of camera images and the shorter calculation time, this method of plotting an analytical function works much faster.

An additional decrease in calculation time is accomplished by calculating an approximating function $F(z)$, in each case only in the vicinity of a maximum focus score $F_n(z_i)$. Each approximating function $F(z)$ is calculated using only the focus scores $F_n(z_i)$ having adjacent focus scores $F_{n-m}(z_i)$ and $F_{n+m}(z_i)$ with smaller values, ($m \geq 1$ defines the magnitude of the vicinity). With this method, a different approximating function $F(z)$ can be calculated for each local maximum of the focus scores $F(z_i)$. Since only a few focus scores $F(z_i)$ are necessary for approximation purposes, the calculation time is greatly reduced.

The present invention was described with reference to exemplary embodiments. It is, however, apparent to any person skilled in this art that modifications and variations can be made without departing from the scope of protection of the Claims set forth below.

What is claimed is:

1. A method of measuring thickness of a film comprising:

providing a single illumination beam propagating along an optical axis and illuminating the transparent film, the transparent film having a first and a second surface;

causing the illumination beam to reflect from the first surface of the transparent film, pass through a focusing means and form an image on an image capturing device, the image being characterized by a first image score;

altering a position of the transparent film along the optical axis relative to the focusing means, thereby altering the first image score until it reaches a second image score corresponding to an image being formed on the image capturing device by the illumination beam being reflected from the second surface of the transparent film; and utilizing the first image score and the second image score to measure the thickness of the transparent film.

2. The method of claim 1, wherein altering the position of the film along the optical axis relative to the focusing means comprises displacing the film along the optical axis.

3. The method of claim 1, wherein the first image score corresponds to a first maximal contrast of the image and wherein the second image score corresponds to a second maximal contrast of the image.

4. The method of claim 2, wherein altering the position of the film comprises discreetly displacing the film along the optical axis and assigning a discreet image score to each intermediate image formed during the discreet displacement.

5. The method of claim 1, wherein utilizing the first image score and the second image score to measure the thickness of the film comprises measuring a displacement of the film between positions corresponding to the first and second image scores.

6. A method for thickness measurement on transparent films, comprising the following steps:

a) illuminating an object, having a transparent film, by a single illumination beam that is guided through an objective which has an optical axis oriented perpendicular to the transparent film, a structured focusing aid being arranged in the illumination beam, and a camera being arranged in an imaging beam, in positions conjugated with the focal plane of the objective;

b) stepwise displacing the object relative to the objective in a Z direction, parallel to the optical axis, to discrete positions $z_i$;

c) recording of a camera image at each stop position $z_i$, and measuring an associated $z_i$ value;

d) identifying a focus score $F(z_i)$, assigned to the respective position $z_i$, from each recorded camera image;

e) determining the maxima of the focus scores $F(z_i)$;

f) assigning the maxima to interfaces of the object; and g) determining the thickness of the transparent film enclosed in the object from the difference between the two $z_i$ positions $z_1$, $Z_2$ of the maxima assigned to its interfaces, the thickness d of the transparent film being given by $d=(z_1-z_2)\times n_{film}$, where $n_{film}$=the refractive index of the film.

7. The method as defined in claim 6, comprising the further steps:

a) determining an approximating function F(z) from the discrete focus scores $F(z_i)$;

b) determining the analytical maxima of the function F(z); and c) determining the thickness of the transparent film from the analytical maxima of the function F(z).

8. The method as defined in claim 6, comprises determining an approximation function F(z) in the vicinity of those discrete focus scores $F_n(z_i)$ whose adjacent focus scores $F_{n-m}(z_i)$ and $F_{n+m}(z_i)$ have lower values, the vicinity being defined as $m \geq 1$.

9. An apparatus for carrying out the method for thickness measurement on transparent films, comprising:

a) an object that has a transparent film;

b) a light source;

c) an objective through which an illumination beam, proceeding from the light source and having an optical axis oriented perpendicular to the transparent film, is directed onto the object;

d) a structured focusing aid arranged in the illumination beam in a position conjugated with a focal plane of the objective;

e) a camera arranged in an imaging beam, defined by the apparatus, in a position conjugated with the focal plane of the objective;

f) a drive unit for displacing the object relative to the objective in a Z direction, parallel to the optical axis, to discrete positions $z_i$;

g) a Z-position measurement unit for measuring the $z_i$ values of the $z_i$ positions stopped at;

h) an image recording unit connected to the camera;

i) an image processing unit for identifying a focus score $F(z_i)$, assigned to one of the respective positions $z_i$, from each recorded camera image;

j) a calculation unit for evaluating the focus scores $F(z_i)$ and determining the thickness of the transparent film; and k) a control unit, for controlling execution of the method, that is connected to the other units.

10. The apparatus as defined in claim 9, wherein the object is an object support that carries a transparent liquid film.

11. The apparatus as defined in claim 9, wherein the object is a microcuvette that contains a transparent liquid.

12. The apparatus as defined in claim 9 wherein the structure on the focusing aid is at least one bar whose bar length is a multiple of the bar width, the bar width being a multiple of the resolution capability of the objective and the camera.

13. The apparatus as defined in claim 12, wherein the structure on the focusing aid is at least one cross made up of two bars.

* * * * *

UNITED STATES PATENT AND TRADEMARK OFFICE
CERTIFICATE OF CORRECTION

PATENT NO. : 6,545,765 B1
DATED : April 8, 2003
INVENTOR(S) : Michael Ganser and Albrecht Weiss It is certified that error appears in the above-identified patent and that said Letters Patent is hereby corrected as shown below:

<u>Title page,</u>
Item [73], Assignee, delete "Leica Microsystems Heidelberg GmbH" and insert
-- Leica Microsystems Wetzlar GmbH --

Signed and Sealed this

Twenty-seventh Day of January, 2004

JON W. DUDAS
*Acting Director of the United States Patent and Trademark Office*